(12) United States Patent
Yonge, III et al.

(10) Patent No.: US 7,756,039 B2
(45) Date of Patent: Jul. 13, 2010

(54) DATA PLANE AGGREGATION BASED ON ROUTE AND SERVICE TYPE

(75) Inventors: Lawrence W. Yonge, III, Ocala, FL (US); Srinivas Katar, Gainesville, FL (US); Manjunath Krishnam, Gainesville, FL (US)

(73) Assignee: Atheros Communications, Inc., Santa Clara, CA (US)

( * ) Notice: Subject to any disclaimer, the term of this patent is extended or adjusted under 35 U.S.C. 154(b) by 225 days.

(21) Appl. No.: 12/132,974

(22) Filed: Jun. 4, 2008

(65) Prior Publication Data

US 2009/0040930 A1 Feb. 12, 2009

Related U.S. Application Data

(60) Provisional application No. 60/941,949, filed on Jun. 4, 2007.

(51) Int. Cl.
*H04J 1/16* (2006.01)
(52) U.S. Cl. .................. 370/235; 370/395.21
(58) Field of Classification Search ........... None
See application file for complete search history.

(56) References Cited

U.S. PATENT DOCUMENTS 6,574,195 B2 * 6/2003 Roberts .................. 370/235

| | | | |
|---|---|---|---|
| 2003/0048183 A1 | 3/2003 | Vollmer et al. | |
| 2003/0095551 A1* | 5/2003 | Gotoh et al. | 370/395.3 |
| 2003/0137993 A1 | 7/2003 | Odman | |
| 2004/0165532 A1 | 8/2004 | Poor et al. | |
| 2005/0001694 A1 | 1/2005 | Berkman | |
| 2005/0114489 A1* | 5/2005 | Yonge et al. | 709/223 |
| 2005/0190785 A1 | 9/2005 | Yonge, III et al. | |
| 2007/0025391 A1 | 2/2007 | Yonge, III et al. | |
| 2007/0286074 A1* | 12/2007 | Xu | 370/230 |
| 2008/0212591 A1* | 9/2008 | Wu et al. | 370/395.21 |

FOREIGN PATENT DOCUMENTS

EP 1748597 A1 1/2007

OTHER PUBLICATIONS

Opera Specification-Part 1: Technology, Open PLC European Research Alliance, 198 pages, 1006.*
HomePlug AV White Paper, Homeplug Powerline Alliance, 11 pages, 2005.*
Loh et al, Quality of Support and priority Management in HomePNA 2.0 Link Layer, IEEE, 6 pages, 2003.*

* cited by examiner

*Primary Examiner*—Frank Duong
(74) *Attorney, Agent, or Firm*—Fish & Richardson P.C.

(57) ABSTRACT

Methods and systems are operable to aggregate data. A plurality of data units can be received. The data units can be combined based upon a class associated with the data and a next hop associated with the data. A link can be provided for the combined data units based on service quality requirements for the traffic class associated with the class.

21 Claims, 7 Drawing Sheets

US 7,756,039 B2

DATA PLANE AGGREGATION BASED ON ROUTE AND SERVICE TYPE

RELATED APPLICATIONS

This application is a utility application claiming priority to U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

This disclosure relates to data plane aggregation.

BACKGROUND

A network of communication stations can share a communication medium (e.g., wires connecting multiple stations or spectrum for transmitting radio signals among stations) using any of a variety of access techniques. Some access techniques (e.g., carrier sense multiple access (CSMA) techniques) include a contention period in which stations contend for use of the medium for transmitting a signal by sensing when the medium is idle. In CSMA techniques, "collisions" sometimes occur when signals from two or more stations overlap. Some channel access techniques can also provide a contention free period in which a specific station or stream is provided exclusive control of the medium. Channel access techniques are used to provide varying levels of Quality of Service (QoS). For example, contention based channel access may be used to provide best-effort service while contention free channel access may be used to provide guaranteed QoS (bandwidth, latency, jitter and packet loss probability). Stations can have traffic flows that are intended for different destination and with varying levels of QoS requirements. Providing separate channel access for each traffic flow is inefficient due to the overhead required for each channel access. However, providing a single channel access for all traffic flows intended for the same destination results in degradation of Quality of Service.

SUMMARY

The following are various aspects described herein. In various aspects, systems, methods, apparatuses and computer program products are provided. In one aspect, methods for communicating among stations in a network are disclosed, which comprise: establishing a plurality of end-to-end connections each comprising a plurality of data units, wherein the data units belonging to each connection are assigned a traffic class; receiving the plurality of data units at a station; determining the traffic class and a next hop destination for the plurality of data units; combining one or more data units that share a common traffic class and a common next hop destination into one or more traffic class data units; and providing a link to transmit the one or more traffic class data units to a next hop destination based on service quality requirements for the traffic class associated with the traffic class data unit.

Other method for communicating among stations in a network can include: establishing a plurality of end-to-end connections each comprising a plurality of traffic packets, wherein the end-to-end connections are established based on a final destination and a traffic class of the plurality of traffic packets; receiving the plurality of traffic packets at a station; monitoring a media access control (MAC) frame header of a traffic packet, wherein the MAC frame header comprises a destination address and a link identifier; determining a traffic class and a next hop destination based on the MAC frame header; aggregating one or more traffic packets with a common traffic class and a common next hop destination; and providing a link to the next hop destination for the aggregated traffic packets based on service quality requirements for the traffic class associated with the aggregated traffic packets.

Communication systems can include a connection generation engine, a data unit monitoring engine and a data unit generation engine. The connection generation engine can establish end-to-end connections comprising data units, wherein the data units belonging to each connection are assigned a traffic class. The data unit monitoring engine can receive the data units and determine the traffic class and a next hop destination for the plurality of data units. The data unit generation engine can combine data units that share a common traffic class and a common next hop destination into one or more traffic class data units and provide a link to transmit the one or more traffic class data units to a next hop destination based on service quality requirements for the traffic class associated with the traffic class data unit.

Other aspects will be found in the detailed description, drawings and claims.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
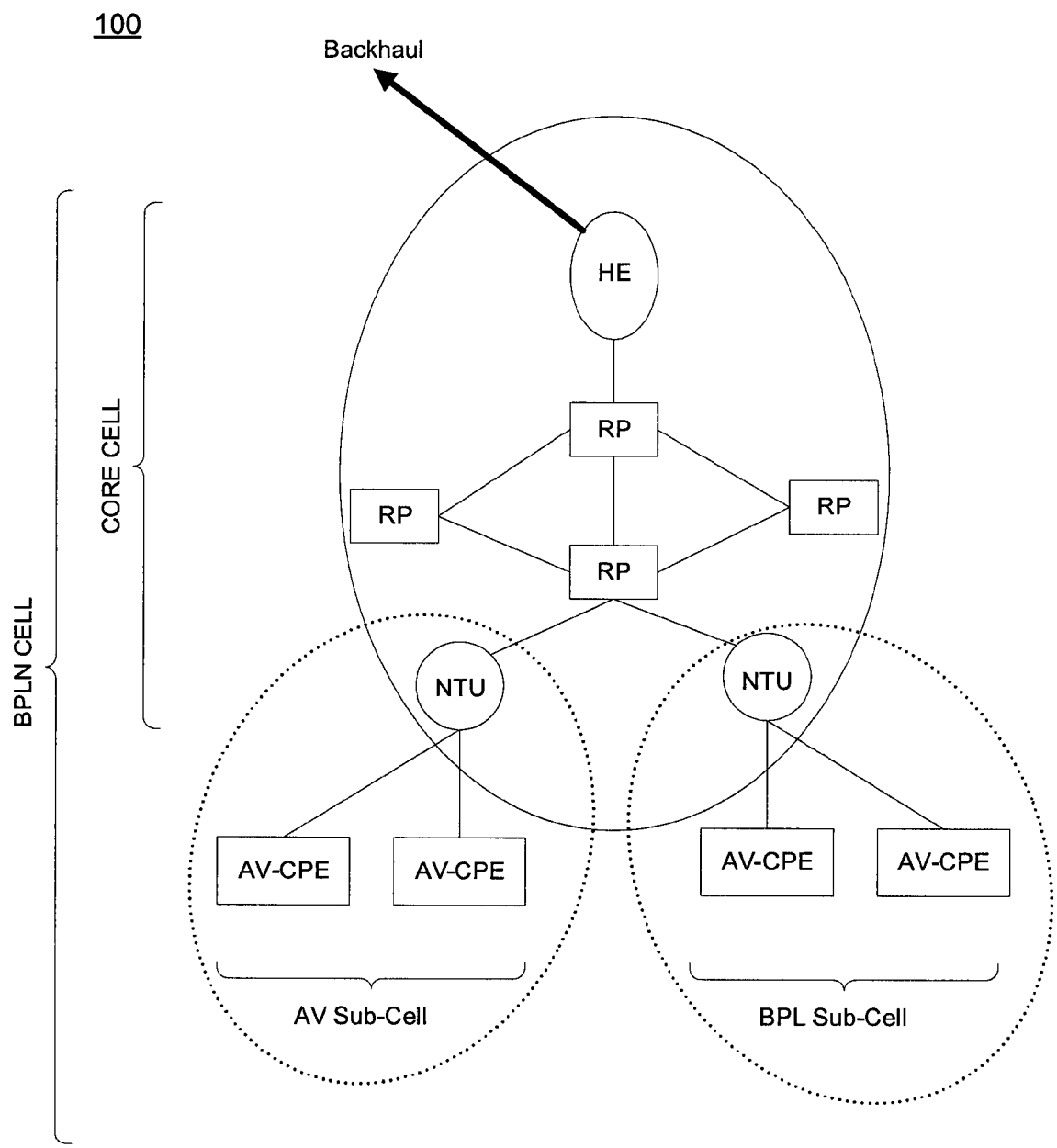
FIG. 1 is a block diagram of a communication network topology.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of application including, smart grid management, broadband internet access, voice and video delivery services, etc. BPLN can be deployed on low voltage, medium voltage and high voltage power lines. BPLN can span the entire neighborhood or it may be deployed within a single multi-dwelling unit. For example, it can be used to provide network service to tenants in a single apartment building. While power lines are a preferred medium for deploying the BPLN, the network can also be deployed on other wire lines like coaxial cables, twisted pair or a combination of these.

A BPLN can include one or more Cells. A cell is a group of broadband power line (BPL) devices in a BPLN that have similar characteristics such as association management, security, quality of service (QoS) and channel access settings, for example. Cells in a BPLN are logically isolated from each other, and communication to and from the backhaul occurs within the cell. Each cell in a BPLN includes a Core-Cell and may also include one or more Sub-Cells. There can be more than one cell on a given physical power line medium.

A Core-Cell includes a group of devices in a BPLN that includes a Head End (HE), Repeaters (R), and Network Termination Units (NTU), but excludes Customer Premise Equipment (CPE). The Head End (HE) is a device that bridges a cell to the backhaul network. At a given time, a cell will have one active Head End and the Head End manages the cell including the Core-Cell and any associated Sub-Cells. A Repeater (RP) is a device that selectively retransmits MAC Service Data Units (MSDUs) to extend the effective range and bandwidth of the BPLN Cell. Repeaters also perform routing and QoS functions. The Network Termination Unit (NTU) is a device that connects a BPLN cell to the end users' network or devices. The NTU may in some cases bridge to other network technologies such as WiFi. A single NTU may serve more than one customer. Each Sub-Cell is associated with an active NTU. It should be noted that HE, NTU and RP are various roles of a station. In some implementations, a single device may be designed to play multiple roles. For example, a single device can simultaneously provide the functionality of both a repeater and an NTU.

Various types of CPE devices are the endpoint nodes in the network and can communicate with other nodes in the network through the NTU. Each node in the network communicates as a communication "station" (STA) using a physical (PHY) layer protocol that is used by the nodes to send transmissions to any other stations that are close enough to successfully receive the transmissions. STAs that cannot directly communicate with each other due to distance can use one or more repeater STAs to communicate with each other.

Any of a variety of communication system architectures can be used to implement the portion of the network interface module that converts data to and from a signal waveform that is transmitted over the communication medium. An application running on a station provides and receives data to and from the network interface module. A MSDU is a segment of information received by the MAC layer. The MAC layer can process the received MSDUs and prepare them to generate "MAC Protocol Data Units" (MPDUs). A MPDU is a segment of information including header and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the PHY layer.

Apart from generating MPDUs from received MSDUs, the MAC layer can provide several functions including, for example, channel access control, providing the required QoS for the MSDUs, retransmission of corrupt information, routing and repeating. Channel access control can enable stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanisms can also be used. The PHY layer can also use a variety of techniques to enable reliable and efficient transmission over the transmission medium (power line, coax, twisted pair etc). Various modulation techniques including, for example, orthogonal frequency division multiplexing (OFDM), wavelet modulations can be used. In various implementations, forward error correction (FEC) code line Viterbi codes, Reed-Solomon codes, concatenated code(s), turbo codes, low density parity check code, etc., can be employed by the PHY to overcome errors. Some implementations of the MAC and PHY layers used on a powerline medium are based on a HomePlug AV specification.

Some implementations of the PHY use OFDM modulation. Using OFDM modulation, data is transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
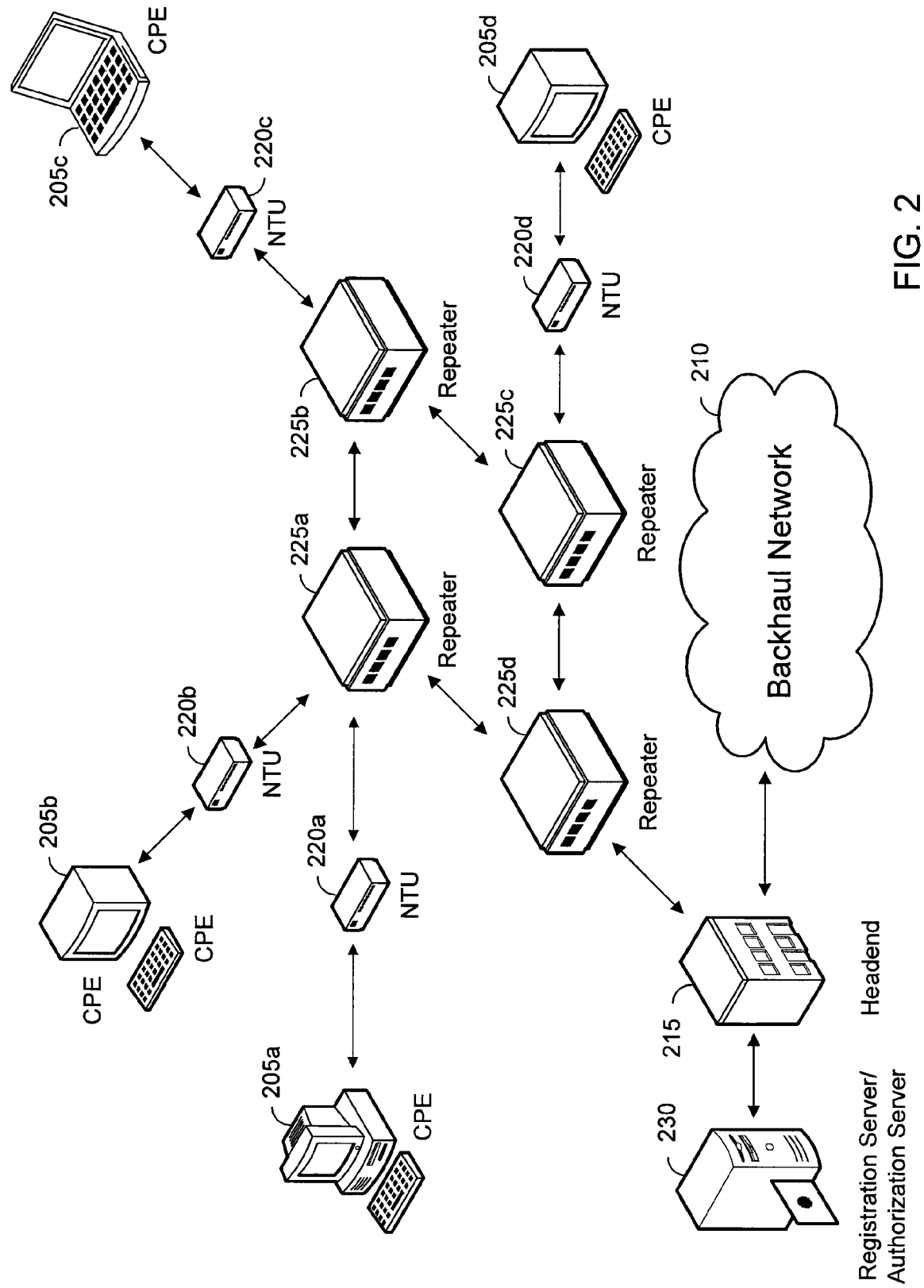
FIG. 2 is a block diagram of a powerline communication network.

FIG. 2 is a block diagram of a powerline communication network. In various implementations, a powerline communication network can enable customer premises equipment (CPE) devices 205a-d to access a backhaul network 210 through a gateway (e.g., a headend server 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205a-d can communicate with the headend 215 through a network of network termination units 220a-d and repeaters 225a-d. In some implementations, the network termination units can operate to translate the data signals from the CPE devices in any of a variety of communications protocols onto a powerline network. For example, a CPE 205a-d might communicate with an NTU 220a-d using a IEEE 802.11 wireless protocol, and the NTU 220a-d can convert the wireless signal to a signal suitable for transmission on a powerline medium. Systems for transmitting and receiving powerline network signals are further described in FIG. 3.

In various implementations, repeaters 225a-d can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225a-d can be equipped to transfer the signal from the powerline network to the backhaul network 210.

In some implementations, the headend 215 can also include an authorization server. Other implementations include the authorization server within the backhaul network 210. The authorization server can be operable to authenticate CPE devices 205a-d for transmission of data over the powerline network. When a CPE device 205a-d is not authenticated, in various implementations, the CPE device 205a-d can be provided access to a registration server 230. The registration server 230, in various implementations, can enable the user of a CPE device 205*a-d* to register the CPE device 205*a-d* with the network to obtain access to the powerline network.

In various implementations, the registration server 230 can provide a limited registration to a CPE device 205*a-d* to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans. For example, an access plan might allow a user to purchase access for a specified period of time, at a specified bandwidth, or combinations thereof. In various implementations, the registration server is not be co-located with the authorization server. In other implementations the registration server and authorization server are co-located, such as shown in FIG. 2. In various implementations, the registration server can be part of the backhaul network 201.

Figure 3:
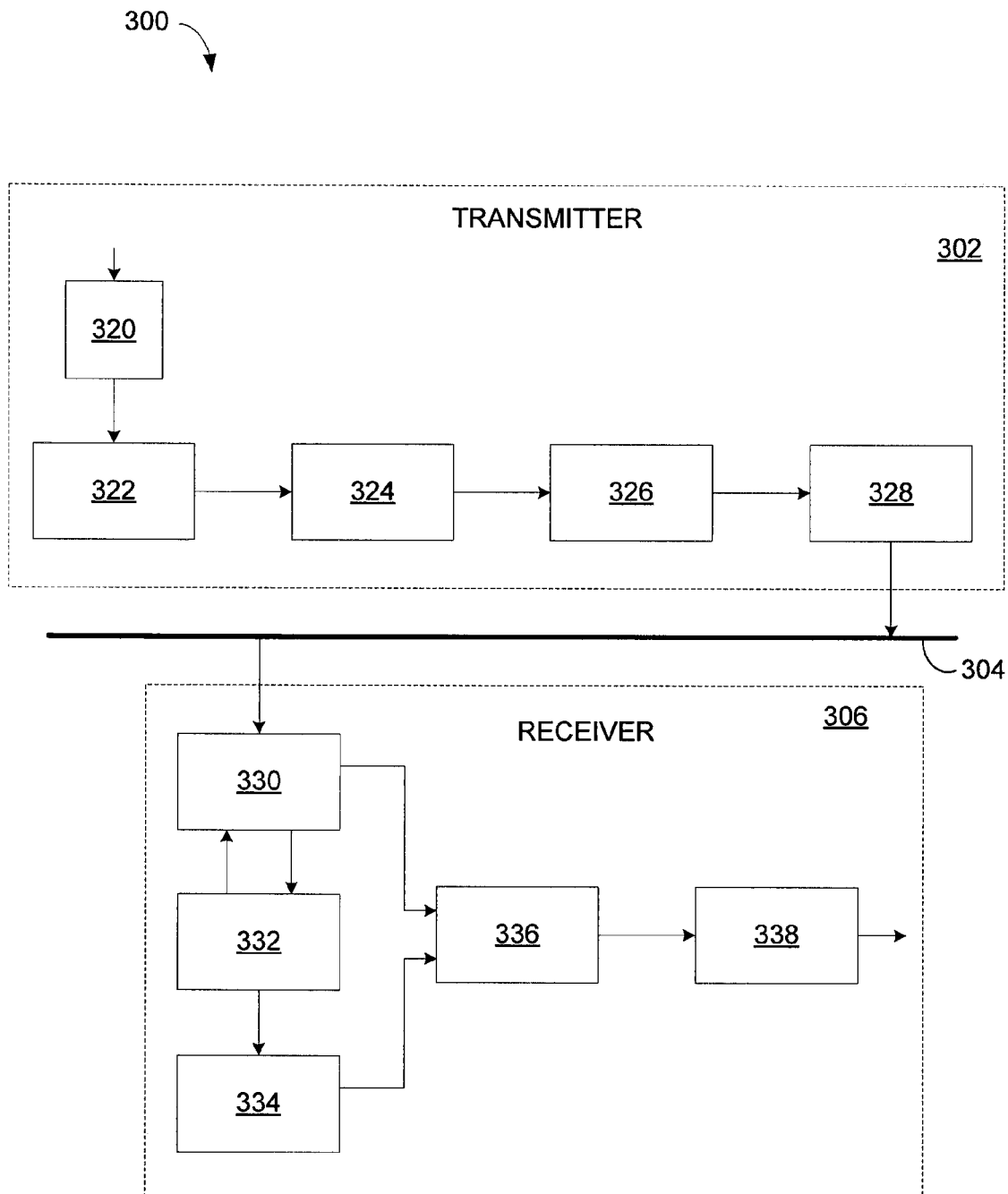
FIG. 3 is a block diagram illustrating components associated with devices communicating over the access network.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N. $A_i$ is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau; t)$ representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including deinterleaving and descrambling).

Any of the modules of the communication system 300 including modules in the transmitter 302 or receiver 306 can be implemented in hardware, software, or a combination of hardware and software.

Figure 4:
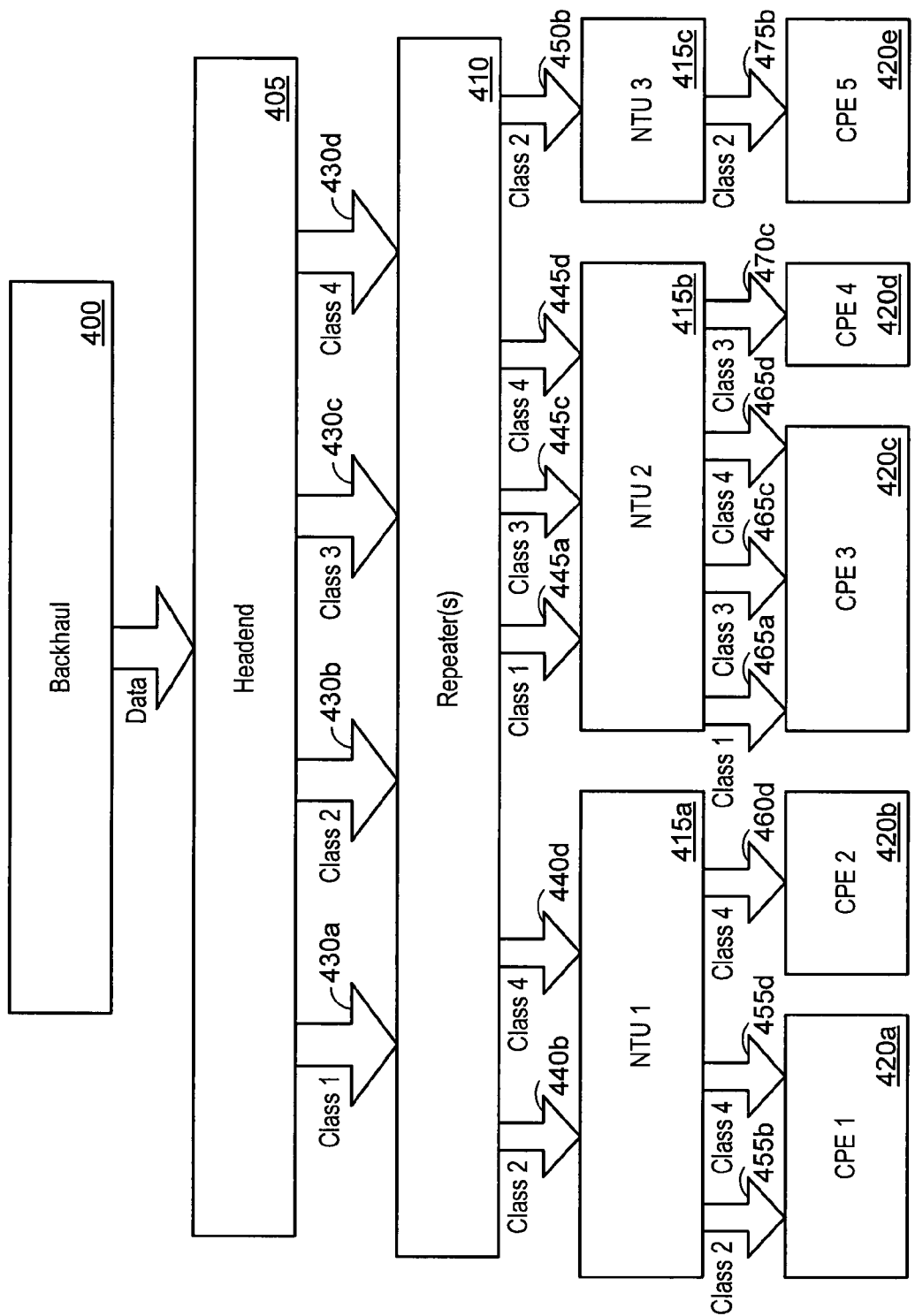
FIG. 4 is a block diagram of example data plane aggregation within a network.

FIG. 4 is another block diagram of example network communications for an access network. In some implementations, the access network can be coupled to a backhaul network 400, for example, through a gateway device. In some examples, the backhaul network 400 can be the internet. In other examples, the backhaul network 400 can be an enterprise data network, a telephone network or any other type of network and/or protocol.

In some implementations, the access network can include a headend 405, repeater(s) 410, NTUs 415a-c, CPE devices 420a-e. The headend can receive data from the backhaul network 400 and distribute the data to repeater(s) 410. The repeater(s) 410 can operate to boost the strength of a data signal transmitted through the network. In some implementations, the headend 405 can aggregate data from the backhaul network destined for devices within the access network. The data can be aggregated based upon a next hop associated with the data and a class associated with the data. For example, there might be several data packets received at the headend 405 that are destined for the same repeater 410. Moreover, some of the sessions associated with the data packets may be such that they are not time sensitive (e.g., electronic mail, instant messaging, text messaging, file transfer protocol (FTP), hypertext transfer protocol (HTTP), etc.) while other sessions associated with the data packets might be highly dependent upon timing (e.g., voice over internet protocol (VoIP), videoconferencing, remote application access, etc.). Thus, the data packets can be grouped based upon the class of traffic associated with the session, thereby facilitating the same QoS to be provided to similar classes of traffic.

In the example of FIG. 4, the data received by the headend 405 from the backhaul network 400 is divided into four classes of traffic, class 1 430a, class 2, 430b, class 3 430c and class 4 430d. In other examples, the data packets can be divided into any number of classes based upon different service levels requested or based upon the number of communication protocols supported. The classes of traffic 430a-d at the headend can be divided based upon predefined classifications. In some implementations, the classes of traffic can correspond to levels of service provided to the data. For example, some subscribers might subscribe to a service level that only provides 1 Mbps of bandwidth, while other subscribers might subscribe to a service level that provides 10 Mbps of bandwidth. In such examples, traffic associated with the subscribers that subscribe to the higher service level can be prioritized over the lower service level.

In other implementations, the classes of traffic can correspond to the type of data being communicated. In such implementations, data transmission protocols that require QoS can be prioritized over data transmission protocols that do not require QoS. For example, class 1 might be associated VoIP data, and class 2 might be associated with electronic message data. In such an example, the headend 405 can prioritize the transmission of class 1 data to minimize interruption and/or jitter in a voice conversion, and can give class 2 traffic a lower priority because there is no QoS component associated with electronic messaging. In some implementations, the headend can assign a link identifier to an end-to-end connection during the initiation of the connection. After initiation of the connection, data associated with the connection can include the link identifier. The link identifier can be used to associate data with a class. In other implementations, the class of traffic might not be explicitly communicated using a link identifier, but instead can be implicitly derived from other fields in the packet. For example, fields in the ethernet packet header (e.g., VLAN tag), IP header (e.g., Type of Service field), etc. can be used to identify the traffic class. In some implementations, the fields in the packet that are used to identify the traffic class can be provided to the station during the initiation of the connection. In other implementations, these fields can be preconfigured into the station or are provided after the station joins the network.

In further implementations, the classes of traffic can correspond to a combination of level of service and type of data being communicated. In such implementations, data associated with users that subscribe to a first service level can be assigned predefined set of traffic classes based upon the type of data being transmitted, while users that subscribe to another service level can be assigned a different set of predefined traffic classes based upon the type of data being transmitted. In some examples, the set of predefined traffic classes associated with the first service level and the set of predefined traffic classes associated with the second service level can overlap. For example, in some instances high priority traffic associated with a low service level user can be classified with low priority traffic associated with a high service level user.

Data can be communicated from the headend 405 to the repeater(s) 410. The repeater(s) 410 can analyze the data received from the headend 405 to identify a next hop associated with the data. The data can be divided based upon the next hop associated with the respective data. In the example of FIG. 4, the repeater(s) 410 transmit data to NTUs 415a-c. The divided data can be further grouped according to the class associated with the data. For example, in FIG. 4, the repeater(s) 410 communicates class 2 data 440b and class 4 data 440d to a NTU 1 415a, while communicating class 1 data 445a, class 3 data 445c and class 4 data 445d to NTU 2 415b, and class 2 data 450b to a NTU 3 415c. The class 2 data 440b communicated from the repeater(s) 410 to NTU 1 415a can include data of the same type and/or service level destined for a CPE device 420a coupled to NTU 1 415a.

In the example of FIG. 4, a single repeater 410 is shown. In various implementations, the headend 405 communicates data to/from multiple repeaters. Moreover, there can be multiple repeaters 410 between the headend 405 and the NTUs 415a-c.

In some implementations, upon receiving the data from the repeater(s) 410, the NTUs 415a-c can divide the data based upon the CPEs 420a-e to which the data is destined. The NTUs 415a-c can then group the data into classes based upon the type of data and/or the service level associated with the CPE device 420a-e. In the example of FIG. 4, NTU 1 415a can group data into a second class 455b and a fourth class 455d destined for CPE 1 420a. NTU 1 415a can also group data into a fourth class 460d destined for CPE 2 420b. Similarly, NTU 2 415b can group data into a first class 465a, a third class 465 c and a fourth class 465d destined for CPE 3 420c, and a third class 470c destined for CPE 4 420d, while NTU 3 415c can group data into second class 475b destined for CPE 5 420e.

In some implementations, outbound data originated by the CPE devices 420a-e can be aggregated at the NTUs 415a-c for transmission to the repeater(s) 410. Similarly, such data can be aggregated by the repeater(s) 410 for transmission to the headend 405. The headend can use the classifiers to prioritize communication of the traffic or bandwidth assigned to the traffic. In further implementations, the devices included in the access network 405-420 can adaptively assign bandwidth to data traffic based upon a class associated with the traffic.

As described in FIG. 1, an access network can, for example, include a group of devices, such as a Head End (HE), Repeaters (R), Network Termination Units (NTU), and Customer Premise Equipment (CPE). Various types of CPE devices are the endpoint nodes in the network and can communicate with other nodes in the network including, such as an NTU, one or more repeaters, and the head end. In one implementation, each node in the network can communicate as a communication "station" (STA) using a physical layer protocol that can be used by the nodes to send transmissions to any other stations that are close enough to successfully receive the transmissions. The stations have the potential to interfere with each other, but techniques can be used to coordinate in a centralized and/or distributed manner, as described in more detail herein.

In one implementation, traffic between a pair of STAs that can communicate directly with one another can be exchanged as part of one or more links. For example, broadband power line (BPL) links can be categorized as either connection-based links and/or connectionless (e.g., priority) links. For example, each link can map to a unique MAC frame stream, or queue, within the STA. In one implementation, when multiple links are present between a pair of STAs, the prioritization of traffic can be enabled based on QoS metrics associated with the links.

In one implementation, link identifiers (LID) can be used to identify traffic belonging to various links between a pair of STAs. A MAC frame header can contain a LID associated with the data unit that transmits the data between links. In one implementation, a priority link identification (PLID) can be used for connectionless traffic. The PLID can indicate the traffic class and/or channel access priority for priority resolution during carrier sense multiple access (CSMA). In another implementation, a connection link identification (CLID) can be used for connection based traffic. For example, the connection links can be established as part of the TDMA allocation procedure, and the CLID associated with the traffic belonging to an established connection can determined by the HE.

Figure 5:
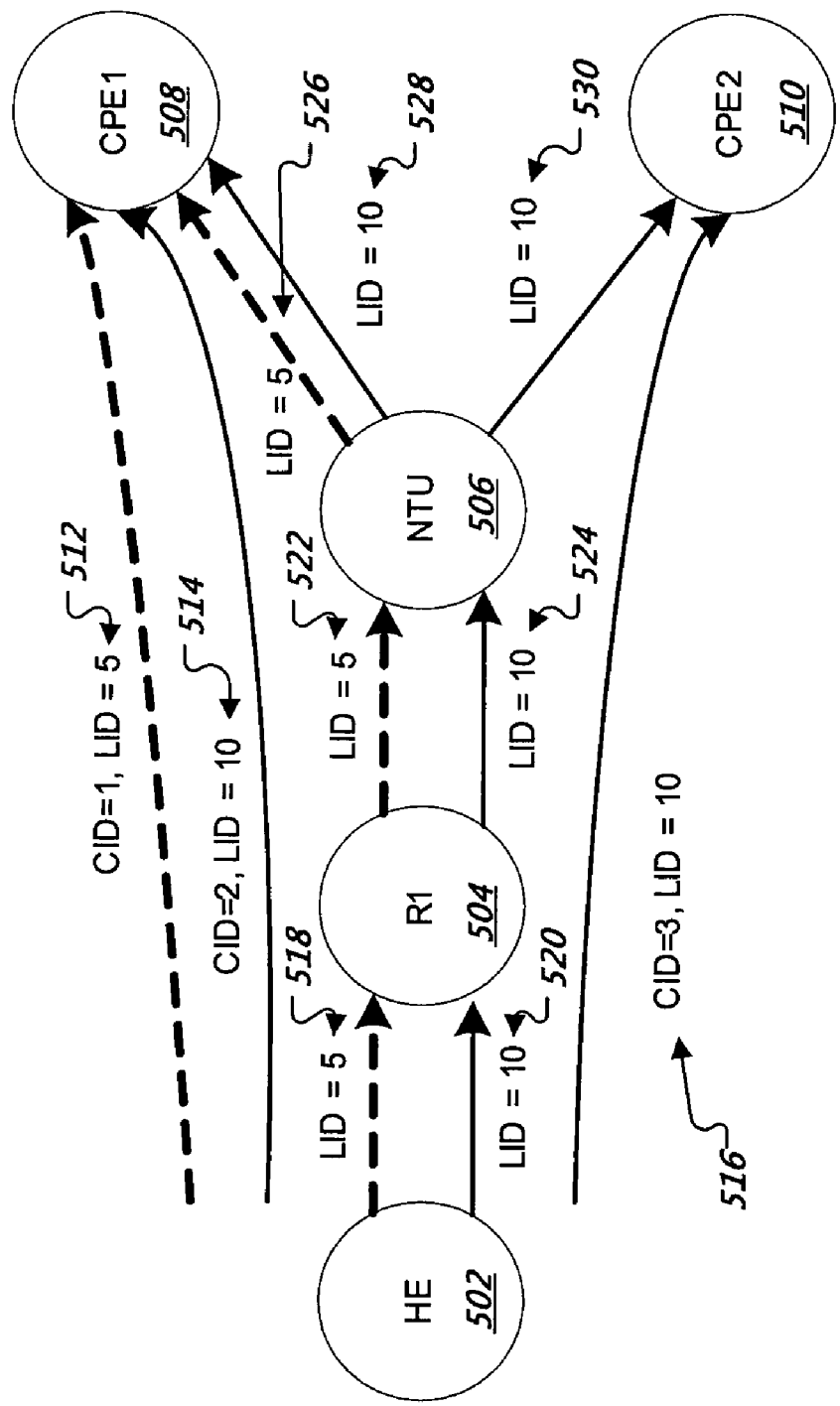
FIG. 5 is a block diagram of another example data plane aggregation within a network.

FIG. 5 is a block diagram of example network communications for an access network. In various examples, the devices in an access network can include: a head end, HE 502, a repeater, R1 504, a network termination unit, NTU 506, a first customer premise equipment, CPE1 508, and a second customer premise equipment CPE2, 510. Additionally, FIG. 5 illustrates three unidirectional downstream connections in the network with connection identifiers (CID) of 1, 2, and 3. However, in other examples, the connections can be bidirectional or unidirectional upstream connections. For example, the first connection 512 is between HE 502 and CPE1 508 and has a LID of 5. The second connection 514 is between HE 502 and CPE1 508 and has a LID of 10. The third connection 516 is between HE 502 and CPE2 510 and has a LID of 10.

In some implementations, when a device has traffic (e.g., data) with multiple LIDs that is intended for the same destination (e.g., the next device or hop), the traffic can be transmitted as separate data units. In another implementation, when a device has traffic (e.g., data) with the same LID that is intended for the same destination (e.g., the next device or hop), the traffic can be transmitted in a single data unit, or a single burst of data units.

In FIG. 5, there are two classes of links, LID=5 518 and LID=10 520, for data communicated between HE 502 and R1 504. In some implementations, the HE 502 can determine that the traffic with the same LID and with the same next hop destination can be aggregated and transmitted together in a combined data unit from HE 502 to R1 504, while traffic that includes different LIDs or different next hop destinations can be transmitted in separate units from HE 502 to R1 504. For example, at the HE 502, traffic from the second connection 514 and the third connection 516 can be aggregated into a single data unit (e.g., link 520), because the second connection 514 and the third connection 516 share the same LID and have the same next hop destination. Furthermore, the traffic from the first connection 512 can be included in a separate data unit (e.g., link 518), because it does not share the same LID with the second connection 514 and the third connection 516.

In some implementations, after the next device receives the aggregated and/or separate data via the links, the next device determines how the data can be aggregated and/or separated to be transmitted to the next device. For example, in the illustration of FIG. 5, two links of data, LID=5 518 and LID=10 520, can be received at R1 504 from HE 502. At R1, it can be determined that the traffic with the same LID and with the same next hop destination can be aggregated and transmitted together in a data unit from R1 504 to NTU 506, while traffic that has different LIDs and different next hop destinations can be transmitted in separate units from R1 504 to NTU 506.

For example, at R1 504, there are two link identifiers (e.g., LID=5, LID=10) represented in the three connections between R1 504 and NTU 506. Therefore, at R1 504, traffic from the second connection 514 and the third connection 516 can be aggregated into a single link 524, because the second connection 514 and the third connection 516 share the same LID (e.g., LID=10) and are being transmitted to the same next hop destination, NTU 506. Furthermore, the traffic from the first connection 512 can be included in a separate link 522, because it does not share the same LID (e.g., LID=5) with the second connection 514 (e.g., LID=10) and the third connection 516 (e.g., LID=10).

At the NTU 506, traffic can be received via two links 522, 524 from R1 504. The NTU 506 can determine how to transmit the traffic downstream to CPE1 508 and CPE2 510. The NTU 506 can determine that traffic with the same LID and with the same next hop destination can be aggregated and transmitted together in a combined data unit from NTU 506 to CPE1 508 or CPE2 510, while traffic that has different LIDs and different next hop destinations can be transmitted in separate units from NTU 506 to CPE1 508 or CPE2 510.

For example, at the NTU 506, the first connection 512 has a LID=5 and needs to be transmitted to CPE1 508; the second connection 514 has a LID=10 and needs to be transmitted to CPE1 508; and the third connection 516 has a LID=10 and needs to be transmitted to CPE2 510. Therefore, at NTU 506, none of the three connections share the same LID and the same next hop destination, and the traffic can be transmitted via separate links 526, 528, 530 to the respective CPE 508, 510. For example, as illustrated in FIG. 5, the traffic from the first connection 512 can be included in a separate link 526 from NTU 506 to CPE1 508; the traffic from the second connection 514 can be included in a separate link 528 from NTU 506 to CPE1 508; and the traffic from the third connection 516 can be included in a separate link 530 from NTU 506 to CPE2 510.

Figure 6:
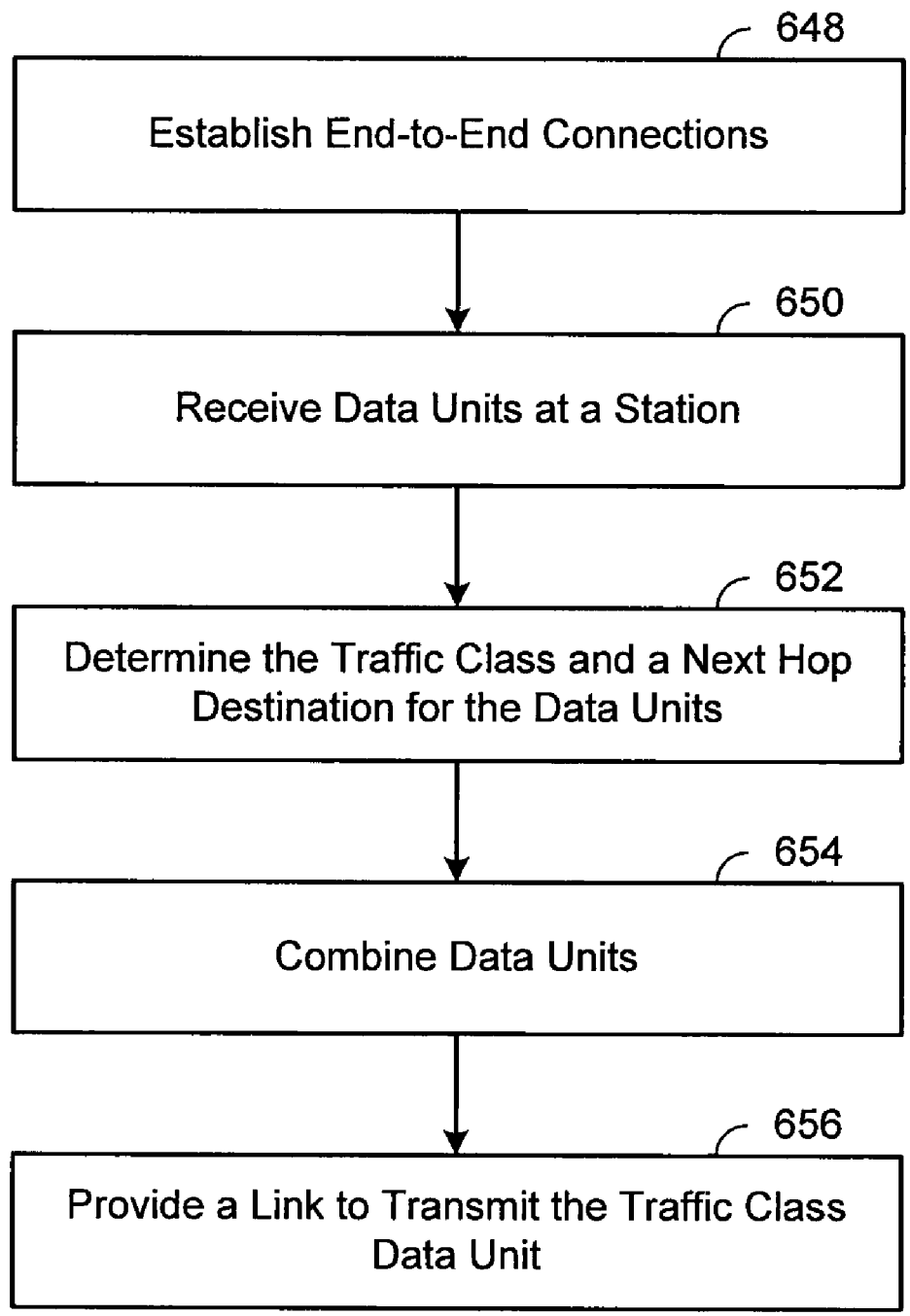
FIG. 6 is flow diagram of an example process for aggregating communications based on route and service type.

FIG. 6 is flow diagram of an example process for communications over a network. At stage 648, a plurality of end-to-end connections each comprising a plurality of data units are established. In some implementations, the end-to-end connections can be established by a headend (e.g., headend 405 of FIG. 4). The data units belonging to each connection are assigned a traffic class when the end-to-end connections are established. Some of the end-to-end connections can include the same traffic class. For example, as illustrated in FIG. 5, there are three unidirectional downstream connections in the network with connection identifiers (CID) of 1, 2, and 3. These three connections can be classified as end-to-end connections.

At stage 650, data units are received at a station. The data units can be received, for example, by a device (e.g., headend 405, repeater(s) 410, NTUs 415*a-c*, CPEs 420*a-e* of FIG. 4) within an access network. The data units can, for example, be received over a broadband power line network at a station.

At stage 652, a traffic class and a next hop destination is determined for data units. The traffic class and next hop destination of the data units can be determined, for example, by a station within the access network (e.g., headend 405, repeater(s) 410, NTUs 415a-c, or CPEs 420a-e of FIG. 4) examining MAC frame headers associated with the data units. The MAC frame header can include a source address, destination address, connection identifier, and link identifier. In some implementations, the traffic class can be identified by determining the traffic class associated with a link identifier in the MAC frame header. The next hop destination can be identified by determining the destination address in the MAC frame header and utilizing it to determine the next hop destination. In some implementations, the next hop destination can be determined by utilizing a routing table.

At stage 654, data units can be combined. In some implementations, data units that share a common traffic class and a common next hop destination can be combined into a traffic class data unit. For example, in FIG. 5, data units from the second connection 514 and the third connection 516 can be combined into a single traffic class data unit, e.g., link 524, because the second connection 514 and the third connection 516 share the same traffic class (e.g., LID=10) and they are being transmitted to the same next hop destination (e.g., NTU 506).

At stage 656, a link is provided to transmit a traffic class data unit. In some implementations, the link provided to transmit the traffic class data unit to the next hop destination based on service quality requirements for the traffic class associated with the traffic class data unit. In some examples, the service quality requirements associated with the traffic class can be the QoS requirements that can refer to the capability of a network to provide better service to specified types network traffic. The goal of the QoS requirements can be to provide priority including dedicated bandwidth, controlled jitter and latency (required by some real-time and interactive traffic), and improved loss characteristics. QoS requirements can also make sure that providing priority access for one or more data units does not make other transmitted data units fail.

In one implementation, providing a link to transmit a traffic class data unit can include determining a schedule to transmit the traffic class data units to the next hop destination. For example, methods of scheduling communications between stations of a network provided herein can be utilized.

In one implementation, a method for transmitting the traffic class data units to the next hop destination can include providing a physical layer for handling physical communication over the provided link; providing a high level layer that receives traffic class data units from the station and supplies high level data units for transmission over the provided link; providing a MAC layer that receives the high level data units from the high level layer and supplies low level data units to the physical layer; at the MAC layer, encapsulating content from a plurality of the high level data units; dividing the encapsulated content into a plurality of pieces with each piece capable of being independently transmitted; and supplying low level data units containing one or more of the plurality of pieces. A system and method for transmitting traffic class data units as taught in U.S. patent application Ser. No. 10/720,742, filed on Nov. 24, 2003, entitled, "Medium Access Control Layer That Encapsulates Data from a Plurality of Received Data Units into a Plurality of Independently Transmittable Blocks," which is hereby incorporated by reference in its entirety, can be used.

Figure 7:
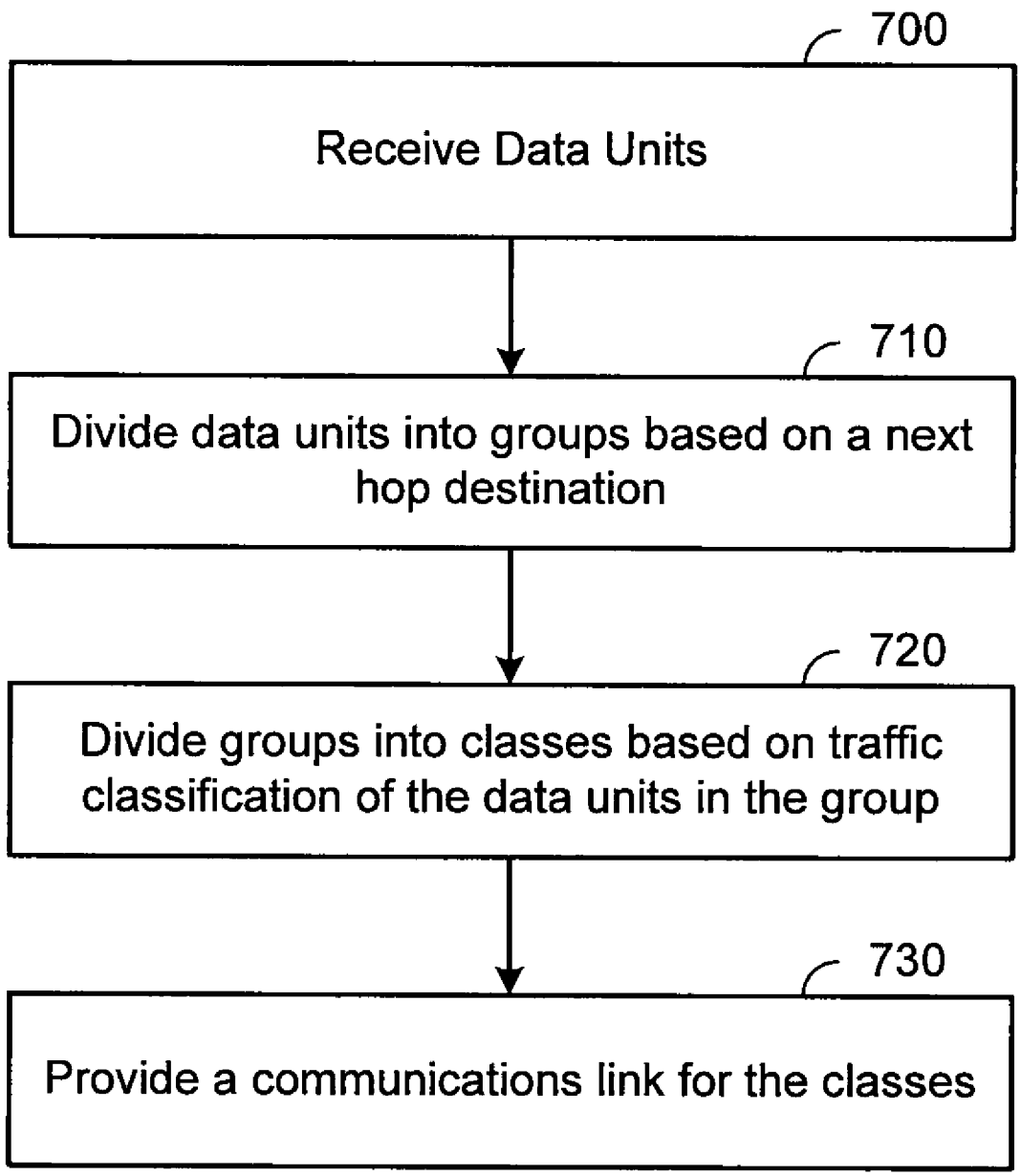
FIG. 7 is a flow diagram of another example process for aggregating communications based on route and service type.

FIG. 7 is a flow diagram of another example process for aggregating communications based on route and service type.

At stage 700, data units can be received. The data units can be received, for example, by a station within an access network (e.g., headend 405, repeater(s) 410, NTUs 415a-c, CPEs 420a-e of FIG. 4). In some implementations, the data units are received subsequent to establishing a connection between the devices within the access network. The connection can be assigned an LID during set up. The LID can identify a class associated with the data units in the connection. In some implementations, the data units can include a MAC frame header that can include a source address, destination address, connection identifier, and link identifier, among others.

At stage 710, data units can be divided into groups based on a next hop destination. The data units can be divided into groups, for example, by a device within the access network (e.g., headend 405, repeater(s) 410, NTUs 415a-c, CPEs 420a-e of FIG. 4). The destination address within the MAC frame header of each data unit can be used to determine the next hop associated with the data unit. In some implementations, a routing table can be used to identify the next hop based upon the destination address in the MAC header. In other implementations, the routing table can be used to identify the next hop based upon the destination address in the MAC header and based upon the LID associated with the traffic. For example, the LID can identify the type of data included in the data unit. The routing of some traffic can be based upon the type of traffic and the bandwidth or other characteristics associated with potential next hop destinations.

At stage 720, the groups can be divided into classes based on traffic classification of the data units in the group. The groups can be divided into classes, for example, by a device within the access network (e.g., headend 405, repeater(s) 410, NTUs 415a-c, CPEs 420a-e of FIG. 4). The data units can be divided into classes, for example, based upon LIDs included within the MAC frame header of the data units.

At stage 730, a communications link is provided for the classes. In some implementations, the link provided to transmit the traffic class data unit to the next hop destination based on service quality requirements for the traffic class associated with the traffic class data unit. In some examples, the service quality requirements associated with the traffic class can be the QoS requirements that can refer to the capability of a network to provide better service to specified types network traffic. The goal of the QoS requirements can be to provide priority including dedicated bandwidth, controlled jitter and latency (required by some real-time and interactive traffic), and improved loss characteristics. QoS requirements can also make sure that providing priority access for one or more data units does not make other transmitted data units fail.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A method for communicating among stations in a network, the method comprising:
    establishing a plurality of end-to-end connections each comprising a plurality of data units, wherein the data units belonging to each connection are assigned a traffic class;
    receiving the plurality of data units at a station;
    determining the traffic class and a next hop destination for the plurality of data units;
    combining one or more data units that share a common traffic class and a common next hop destination into one or more traffic class data units; and
    providing a link to transmit the one or more traffic class data units to a next hop destination based on service quality requirements for the traffic class associated with the traffic class data unit.

2. The method of claim 1, wherein the network comprises a broadband over power line network.

3. The method of claim 1, wherein at least some of the end-to-end connections comprise the same traffic class.

4. The method of claim 1, wherein determining a traffic class for a plurality of data units comprises:
    determining the traffic class from a MAC frame header associated with a data unit.

5. The method of claim 4, wherein the MAC frame header comprises:
    a destination address; and
    the traffic class.

6. The method of claim 1, wherein determining a traffic class for a plurality of data units comprises:
    determining a link identifier associated with the traffic class.

7. The method of claim 1, wherein determining a next hop destination for a plurality of data units comprises:
    utilizing a routing table to determine a next hop destination for a data unit.

8. The method of claim 1, wherein determining a next hop destination for a plurality of data units comprises:
    determining the next hop destination based on a destination address in a MAC frame header associated with the data unit.

9. The method of claim 1, wherein providing a link to transmit the one or more traffic class data units to the next hop destination based on service quality requirements for the traffic class associated with the traffic class data unit comprises:
    determining a schedule to transmit the traffic class data units to the next hop destination in the network.

10. The method of claim 1, comprising:
    transmitting the one or more traffic class data units to the next hop destination over the provided link based on service quality requirements for the traffic class associated with the traffic class data unit.

11. The method of claim 10, wherein transmitting the one or more traffic class data units to the next hop destination over the provided link comprises:
    providing a physical layer for handling physical communication over the provided link; providing a high level layer that receives traffic class data units from the station and supplies high level data units for transmission over the provided link;
    providing a MAC layer that receives the high level data units from the high level layer and supplies low level data units to the physical layer;
    at the MAC layer, encapsulating content from a plurality of the high level data units; dividing the encapsulated content into a plurality of pieces with each piece capable of being independently transmitted; and
    supplying low level data units containing one or more of the plurality of pieces.

12. The method of claim 1, wherein the service quality requirements for the traffic class comprise at least one of:
    bandwidth guarantee requirements;
    latency requirements;
    jitter requirements; and
    packet loss probability requirements.

13. A method for communicating among stations in a network, the method comprising:
    establishing a plurality of end-to-end connections each comprising a plurality of traffic packets, wherein the end-to-end connections are established based on a final destination and a traffic class of the plurality of traffic packets;
    receiving the plurality of traffic packets at a station;

monitoring a MAC frame header of a traffic packet, wherein the MAC frame header comprises a destination address and a link identifier;

determining a traffic class and a next hop destination based on the MAC frame header;

aggregating one or more traffic packets with a common traffic class and a common next hop destination; and providing a link to the next hop destination for the aggregated traffic packets based on service quality requirements for the traffic class associated with the aggregated traffic packets.

14. The method of claim 13, wherein providing a link to the next hop destination for the aggregated traffic packets based on service quality requirements for the traffic class associated with the aggregated traffic packets comprises:

determining a schedule to transmit the aggregated traffic packets to the next hop destination.

15. The method of claim 13, wherein providing a link to the next hop destination for the aggregated traffic packets based on service quality requirements for the traffic class associated with the aggregated traffic packets comprises:

transmitting the aggregated traffic packets to the next hop destination.

16. The method of claim 15, transmitting the aggregated traffic packets to the next hop destination comprises:

providing a physical layer for handling physical communication over the provided link; providing a high level layer that receives traffic packets from the station and supplies high level data units for transmission over the provided link;

providing a MAC layer that receives the high level data units from the high level layer and supplies low level data units to the physical layer;

at the MAC layer, encapsulating content from a plurality of the high level data units;

dividing the encapsulated content into a plurality of pieces with each piece capable of being independently transmitted; and supplying low level data units containing one or more of the plurality of pieces.

17. A network communication system, comprising:

a connection generation engine configured to establish a plurality of end-to-end connections each comprising a plurality of data units, wherein the data units belonging to each connection are assigned a traffic class;

a data unit monitoring engine configured to receive the plurality of data units and determine the traffic class and a next hop destination for the plurality of data units;

a data unit generation engine configured to combine one or more data units that share a common traffic class and a common next hop destination into one or more traffic class data units and provide a link to transmit the one or more traffic class data units to a next hop destination based on service quality requirements for the traffic class associated with the traffic class data unit.

18. The system of claim 17, comprising:

a plurality of stations, each of the stations comprising the data unit monitoring engine and the data unit generation engine.

19. The system of claim 18, wherein the stations comprise head end units, repeaters, and network termination units.

20. The system of claim 18, wherein the plurality of stations comprise a broadband over power line network.

21. The system of claim 17, wherein the connection generation engine if further configured assign a traffic class to the plurality of data units.

* * * * *